United States Patent
Murray et al.

(10) Patent No.: US 10,696,407 B2
(45) Date of Patent: Jun. 30, 2020

(54) TRAY TABLE ARMS WITH ROTATION STOPPER OVERRIDE

(71) Applicant: Safran Seats USA LLC, Gainesville, TX (US)

(72) Inventors: Michael T. Murray, Ardmore, OK (US); Girish J. Malligere, Lake Dallas, TX (US); Michael Willey, Denton, TX (US); Armando Valdes, Krum, TX (US); Melinda A. Izzo, Denton, TX (US); Kevin Creed, Muenster, TX (US); Naintzu Chang, Denton, TX (US); Shaka Thornhill, Flower Mound, TX (US)

(73) Assignee: Safran Seats USA LLC, Gainesville, TX (US)

( * ) Notice: Subject to any disclaimer, the term of this patent is extended or adjusted under 35 U.S.C. 154(b) by 174 days.

(21) Appl. No.: 15/751,225

(22) PCT Filed: Apr. 21, 2016

(86) PCT No.: PCT/US2016/028616
§ 371 (c)(1),
(2) Date: Feb. 8, 2018

(87) PCT Pub. No.: WO2017/034624
PCT Pub. Date: Mar. 2, 2017

(65) Prior Publication Data
US 2018/0229848 A1    Aug. 16, 2018

Related U.S. Application Data

(60) Provisional application No. 62/217,265, filed on Sep. 11, 2015, provisional application No. 62/209,252, filed on Aug. 24, 2015.

(51) Int. Cl.
  B64D 11/06    (2006.01)
  B60N 3/00     (2006.01)
  A47C 7/70     (2006.01)

(52) U.S. Cl.
  CPC .......... B64D 11/0638 (2014.12); B60N 3/004 (2013.01); *A47C 7/70* (2013.01); *Y02T 50/46* (2013.01)

(58) Field of Classification Search
  CPC ........ B64D 11/0638; B60N 3/004; A47C 7/70
  (Continued)

(56) References Cited

U.S. PATENT DOCUMENTS

| | | |
|---|---|---|
| 6,761,398 B2 | 7/2004 | Bentley et al. |
| 2007/0138848 A1 | 6/2007 | Schurg et al. |
| 2016/0046224 A1 | 2/2016 | Saada et al. |

FOREIGN PATENT DOCUMENTS

| | | |
|---|---|---|
| WO | 2005073083 | 8/2005 |
| WO | 2014154666 | 10/2014 |

OTHER PUBLICATIONS

International Patent Application No. PCT/US2016/028616, International Search Report and Written Opinion, dated Jun. 17, 2016.
(Continued)

*Primary Examiner* — Mark R Wendell
(74) *Attorney, Agent, or Firm* — Kilpatrick Townsend & Stockton LLP

(57) ABSTRACT

Described are assemblies that include elements of a tray table, such as for an aircraft or other passenger craft. A tray table body can be movable between a stowed configuration and a deployed configuration. A set of arms may support the table body relative to a seat back in the stowed configuration and in the deployed configuration. In response to movement of the seat back (such as in a crash scenario), the arms may permit release of a constraint of the tray table body that
(Continued)

would otherwise inhibit the tray table body from moving with the seat back.

18 Claims, 7 Drawing Sheets

(58) Field of Classification Search
USPC .......................................................... 297/163
See application file for complete search history.

(56) References Cited

OTHER PUBLICATIONS

Europe Patent Application No. 16719699.7, Examination Report (Communication pursuant to Article 94(3) EPC), dated Oct. 25, 2019, 4 pages.

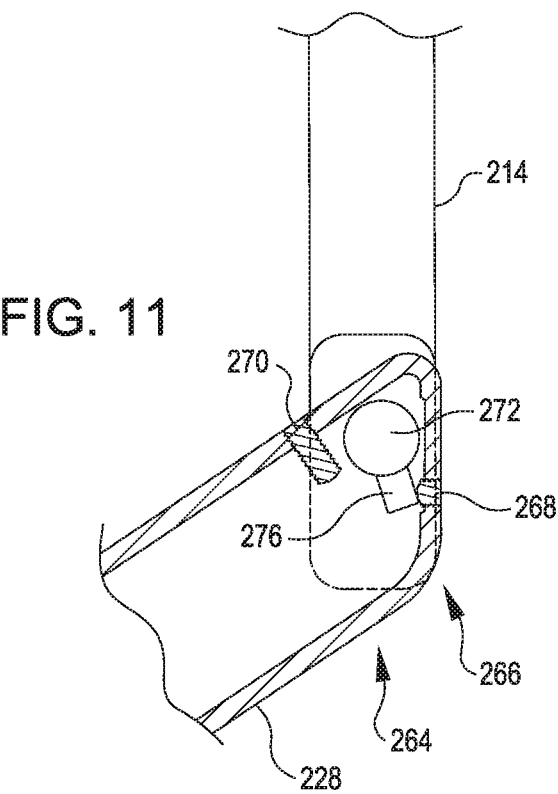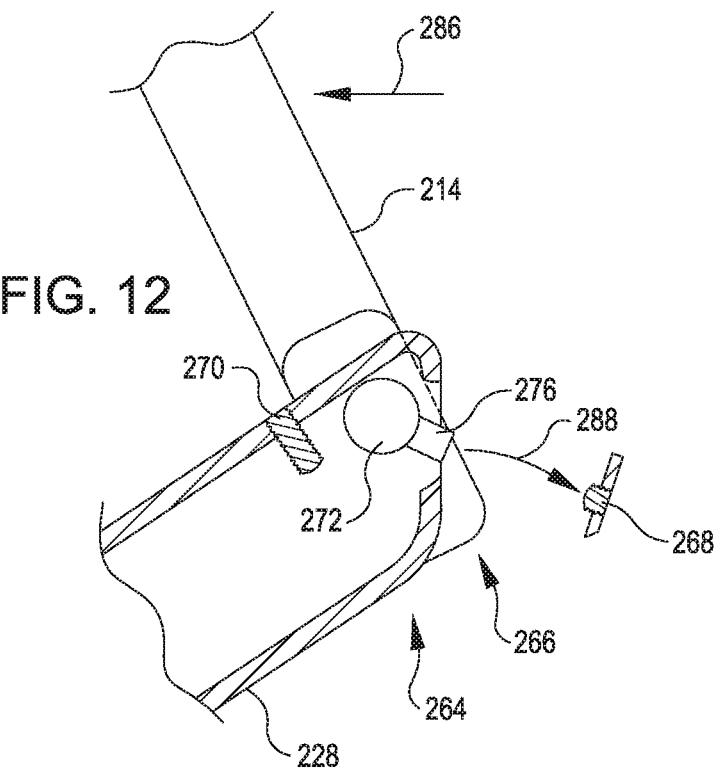

TRAY TABLE ARMS WITH ROTATION STOPPER OVERRIDE

CROSS REFERENCE TO RELATED APPLICATIONS

This application is related to and claims priority benefits from U.S. Provisional Application Ser. No. 62/217,265, filed on Sep. 11, 2015, entitled TRAY TABLE LID and U.S. Provisional Application Ser. No. 62/209,252, filed on Aug. 24, 2015, entitled DUAL FOOD TABLE LATCH, each of which is hereby incorporated in its entirety by this reference.

FIELD OF THE INVENTION

The field of the invention relates to tray table assemblies for passenger vehicles such as aircrafts.

BACKGROUND

Tray tables are widely used in most aircraft seat assemblies. The tray table sub-assembly is typically pivoted on a pair of arms which allows the tray table to swivel between deployed and stowed positions, for example, relative to the back of the aircraft seat. This can provide a convenient table for a person sitting in a position facing the rear of the seat, such as a passenger situated aft of a forward-facing seat. When deployed, tray tables may be used as a surface for supporting food, drink, or other items, such as for work or entertainment during travel. The pivoting nature of the tray table may be useful in allowing the tray table to be readily deployed when desired by a seated passenger or readily stowed, such as to facilitate egress or ingress relative to the seat.

Different latch assemblies exist for retaining tray table assemblies in an upright stowed position when not in use. Various latch assemblies include either a lever (e.g., which may be rotated around an axis) or a slider (e.g., which may move linearly) that may be moved over a portion of a tray table assembly in the upright stowed position. In such a configuration, the lever or the slider can obstruct the pivoting motion of the tray table assembly. In many cases, the lever or slider can stop the tray table assembly from further movement after the tray table assembly has been pivoted to an upright stowed position against the rear of the seat.

Often, the lever or the slider is positioned at a central location between right and left edges of the tray table assembly. In many cases, such central placement permits use of a single lever or slider to retain the tray table assembly in a stowed position, which may reduce an overall number, complexity, and/or weight of components.

However, in some instances, central placement of a latch or slider may pose a hazard to passengers. For example, in certain crash scenarios, a passenger aft of a seat may be propelled in a fore direction such that the passenger's head contacts the seat back at an oblique position above and to the side of the centrally-placed latch or slider. Such oblique contact may cause the seat back to twist about a vertical axis, for example, such that a side edge of the seat back rotates toward the fore, while a center of the seat back remains relatively unmoved. With a tray table secured only at the center of the seat back by a centrally-placed latch or slider, the tray table may follow the motion (or lack thereof) of the center of the seat back. As a result, the side of the seat back may twist away and separate from the side of the tray table. This separation may expose a projecting feature (e.g., the lateral top edge of the tray table) in a likely path of the passenger's head and pose an increased risk of injury for the passenger in the crash scenario, which is desirably avoided.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure a tray table arm includes a pivot mount, a stowed configuration stopper, a deployed configuration stopper, and an override feature. The pivot mount can receive a shaft of a tray table body so as to permit rotation of the tray table body relative to the tray table arm. The stowed configuration stopper and the deployed configuration stopper define ends of a path of travel. The stowed configuration stopper and the deployed configuration stopper are disposed such that the path of travel is sized to permit travel therein of a rotation guide structure coupled with the tray table body such that (i) rotation of the tray table body is obstructed when travel of the rotation guide structure is obstructed and (ii) rotation of the tray table body is allowed when travel of the rotation guide structure is allowed. Generally, the stowed configuration stopper blocks travel of the rotation guide structure past one end along the path of travel so as to prevent rotation of the tray table body past a stowed configuration of the tray table body, and the deployed configuration stopper blocks travel of the rotation guide structure past another end along the path of travel so as to prevent rotation of the tray table body past a deployed configuration of the tray table body. The override feature, in response to exertion of a force exceeding a threshold upon the tray table body, modifies at least one of a position, structure, or configuration of the deployed configuration stopper so as to permit travel of the rotation guide structure past the one end along the path of travel, which permits rotation of the tray table body past the stowed configuration of the tray table body.

In some embodiments, the override feature includes a portion of the tray table arm that includes the stowed configuration stopper. That portion can rupture and permit passage of the rotation guide structure therethrough in response to exertion of the force exceeding the threshold upon the tray table body.

In some embodiments, the override feature includes a biasing member that resists displacement of the stowed configuration stopper from a position at the one end of the path of travel in an absence of exertion of the force exceeding the threshold upon the tray table body.

In some embodiments, the tray table arm receives the rotation guide structure in a configuration in which the rotation guide structure is mounted on the shaft of the tray table body.

In some embodiments, the tray table arm receives the rotation guide structure in a configuration in which the rotation guide structure is coupled with the tray table body separately from the shaft of the tray table body.

In some embodiments, the tray table arm further includes at least one adjustment structure that can adjustably position at least one of the stowed configuration stopper or the deployed configuration stopper so as to change a position of at least one end of the travel path.

According to certain embodiments of the present disclosure, a tray table assembly includes a table body and a set of arms. The table body can be movable between a stowed configuration and a deployed configuration. The set of arms support the table body relative to a seat back in the stowed configuration and in the deployed configuration. The set of arms, in response to movement of the seat back, release a constraint of the table body that would otherwise inhibit the table body from moving with the seat back.

In some embodiments, an upper portion of the table body in the stowed configuration is secured at a first location on a left side of a centerline of the table body and at a second location on a right side of the centerline of the table body.

In some embodiments, the constraint of the table body would otherwise inhibit the table body from moving with the seat back in a twisting motion about an axis oriented from top to bottom of the seat back.

In some embodiments, the table body is pivotable at a lower portion thereof relative to the set of arms.

According to certain embodiments of the present disclosure, a passenger seat includes a seat back, a set of arms, a table body, a constraint, and a constraint release feature. The seat back can have a front and a rear. The table body is supported relative to the seat back by the set of arms and is coupled with the set of arms so as to be movable between a stowed configuration and a deployed configuration. The constraint permits movement of the table body between the stowed and deployed configurations and prevents the table body from travelling beyond the stowed or deployed configurations. The constraint release feature is incorporated into the set of arms. The constraint release feature is deformable to release or modify the constraint when the table body is in the stowed configuration and subjected to a force that makes a portion of the table body move with the seat back. Release or modification of the constraint by the constraint release feature facilitates movement of the table body with the seat back.

In some embodiments, the passenger seat also includes a latch assembly that secures both a left side and a right side of an upper portion of the table body when in the stowed configuration.

In some embodiments, the latch assembly includes a first projection, a second projection, and a cover. The first projection and the second projection extend from the rear of the seat back and are aligned with one another so as to define an axis therebetween. The cover is pivotally mounted on the first projection and the second projection so as to rotate about the axis between a closed configuration in which the cover secures a top portion of the table body in the stowed configuration and an open configuration in which the cover is situated so as to permit movement of the table body to or from the stowed configuration.

In some embodiments, the cover includes a contact surface corresponding to a location in which an upper portion of the table body contacts the cover when the cover is in the closed configuration and the table body is in the stowed configuration. A shape of the cover causes the contact surface to be substantially aligned with the axis when the cover is in the closed configuration.

In some embodiments, the passenger seat also includes a shroud and at least a portion of the cover is rotated behind the shroud when moving between the closed configuration and the open configuration.

In some embodiments, the latch assembly includes a first lever and a second lever. The first lever is positioned to secure the right side of an upper portion of the table body, and the second lever is positioned to secure the left side of an upper portion of the table body. The first lever and the second lever may be operatively coupled such that actuating the first lever will cause actuation of the second lever or actuating of the second lever will cause actuation of the first lever. The latch assembly may also include a central lever positioned to secure a central area of an upper portion of the table body. The central lever can be operatively coupled with the first lever and the second lever such that actuating the central lever will cause actuation of the first lever and the second lever. At least one of the levers may be positioned at least partially within an interior between the front and the rear of the seat back and at least partially within an interior of the table body when the table body is secured by the latch assembly in the stowed configuration.

In some embodiments, the latch assembly includes a central lever positioned to secure a central area of an upper portion of the table body.

BRIEF DESCRIPTION OF THE DRAWINGS

FIG. 11 is side view of the components of FIG. 10 in a stowed configuration.

FIG. 12 is side view of the components of FIG. 10 in another configuration.

DETAILED DESCRIPTION

Figure 1:
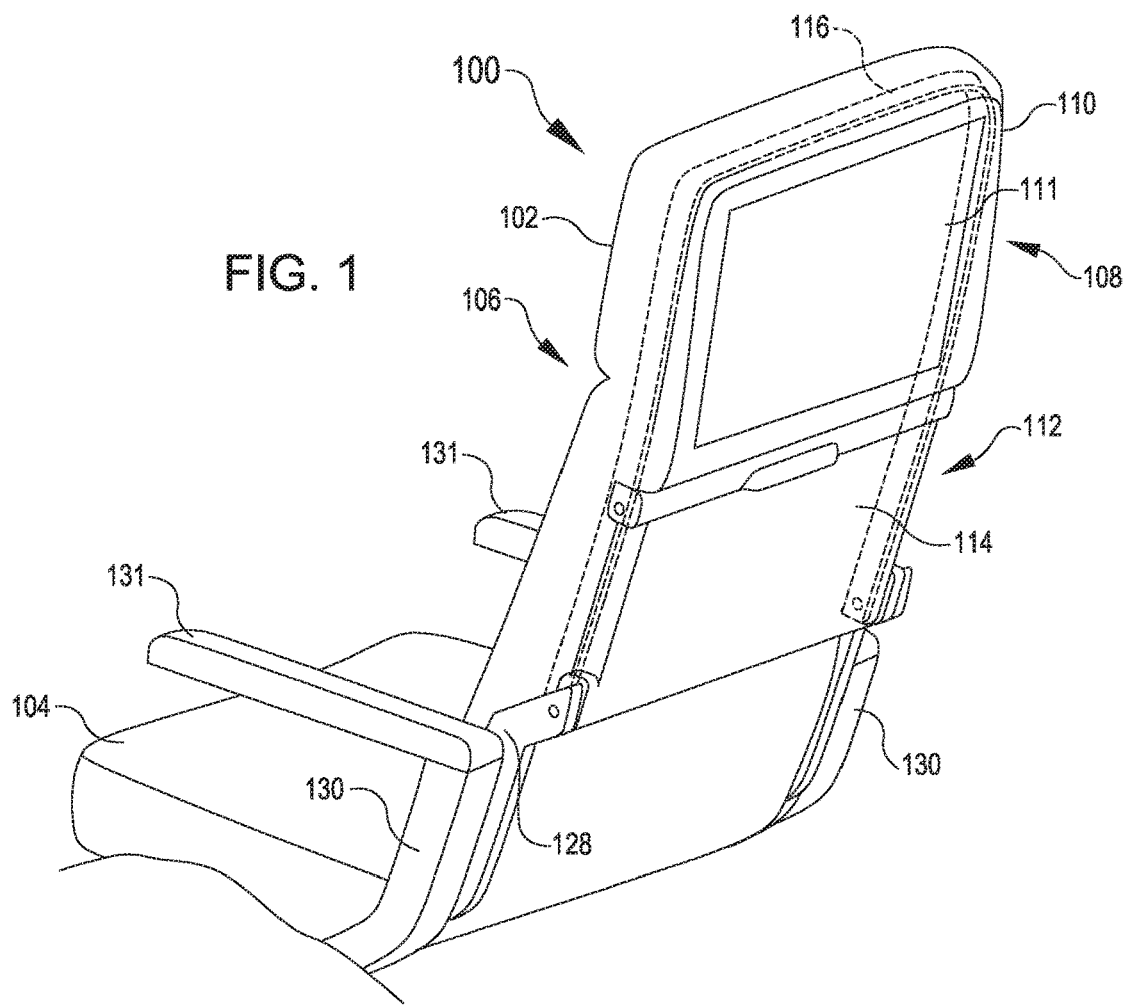
FIG. 1 is a perspective rear view of a seat with a tray table in a stowed configuration, according to certain embodiments of the present disclosure.

The subject matter of embodiments of the present disclosure is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying requirement of any particular order or arrangement among or between various steps or elements except when the order of individual steps or arrangement of elements is explicitly described.

This disclosure provides table assemblies and associated elements thereof for passenger seats. While the table assemblies are discussed for use with aircraft seats, they are by no means so limited. Rather, embodiments of the table assemblies may be used in passenger seats or other seats of any type or otherwise as desired. For example, embodiments may be used on trains, buses, movie theaters, student seating, or any other instance when a tray table on a forward structure may be useful.

In various embodiments, the tray table assemblies include arms with incorporated features that permit release of constraints that might otherwise inhibit certain movement of a tray table body, such as during a crash scenario. Such release of constraints, for example, may provide greater freedom for the table body to move with the seat back and reduce a risk of separation of the table body from the seat back that might otherwise result in a projecting feature that could harm a passenger.

In some embodiments, arms that support a table body relative to a seat back include constraints that, in normal operation, limit the motion of the table body to movement between a stowed position and a deployed position of the table body. For example, a guide pin on or near a pivot shaft of the table body may travel in a space between stoppers formed in an arm.

The arm can also include features that override or release such constraints in specific scenarios. As one example, a stopper may be positioned in a portion of an arm that is of a thickness or other size selected so that the portion will rupture in response to high magnitude forces expected during a crash scenario. Such rupture may permit motion of the guide pin (e.g., through the rupture) that would not be permitted in normal or non-crash situations. As another example, a spring or other biasing member may have a sufficient stiffness or exert a sufficient biasing force to maintain a stopper in a principal blocking position so long as the guide pin is subjecting a normal operating range of force on the stopper. In contrast, in response to the guide pin subjecting an amount of force on the stopper that exceeds the normal operating range (e.g., as may occur in a crash scenario), the spring or other biasing member may also permit movement of the stopper away from the principal blocking position (e.g., thus permitting additional movement of the guide pin).

Overriding or releasing the constraints to allow the table body to move outside of a normal range of motion may improve safety of nearby passengers in many cases. In one example, a tray table body may pivot at or near a lower portion of the tray table and latch to a seat back at or near an upper portion of the tray table. If an upper area of the seat back is pushed forward abruptly in a crash situation, releasable constraints along the pivoting lower portion of the tray table may give way. Such functionality may allow the upper latched portion to move with the seat back, rather than being subjected to a resistance to such motion as might occur in the absence of such releasable constraints.

Figure 2:
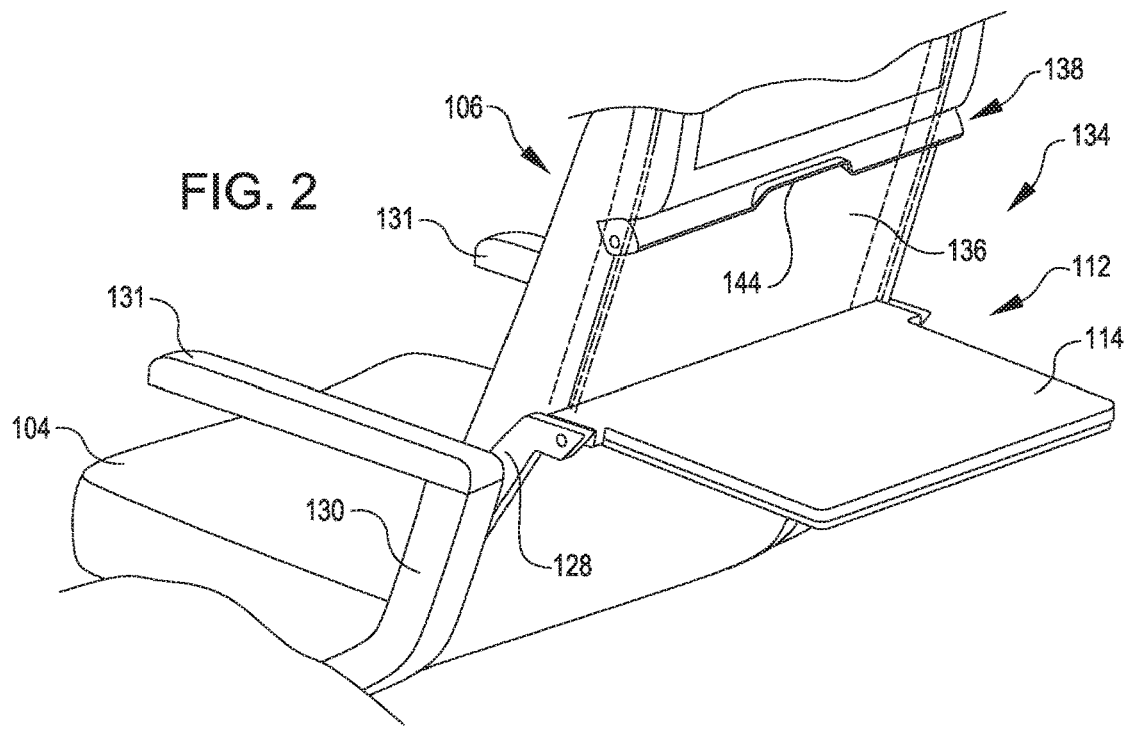
FIG. 2 is a perspective rear view of the seat of FIG. 1 with the tray table in a deployed configuration.

According to certain embodiments of the present disclosure, as shown in at least FIGS. 1-2, a seat 100 may be provided with a tray table assembly 112. Generally, FIGS. 1 and 2 are perspective views showing the tray table assembly 112 in a stowed configuration (FIG. 1) and a deployed configuration (FIG. 2), and FIGS. 3-15 are various views showing elements that may be used in the tray table assembly 112 in greater detail. The illustrated seat 100 includes a seat back 102, a seat pan 104, spreaders 130, armrests 131, and a shroud 110. The illustrated tray table assembly 112 includes a table body 114 and arms 128.

With reference to FIG. 1, the seat back 102 and seat pan 104 form the primary surfaces for supporting a passenger in the seat 100. The seat pan 104 may be oriented substantially horizontally, for example, to provide a suitable surface for receiving the thighs and buttocks of a seated passenger. The seat back 102 may be oriented substantially vertically, for example, to provide a suitable surface for receiving a back, neck, and head of a seated passenger. The seat back 102 may recline in various embodiments, for example, to allow different options for supporting passengers in seated, prone, or other positions.

The seat back 102 has a front 106 and a rear 108. In various embodiments, the seat pan 104 and the front 106 of the seat back 102 include non-rigid or pliable materials (e.g., fabric, textiles, foam, or other cushioning material) for the comfort of passengers when supported in the seat 100. Other more rigid materials may also be included, such as to reinforce pliable materials, or to provide components for other functions. As one example, the seat back 102 may include a frame 116 (e.g., within the seat back 102) that serves as a base support structure to which cushioning and/or other elements can be mounted or otherwise attached. As another example, the shroud 110 may correspond to a component that is formed from rigid material and that is coupled with cushioning material of the seat back 102 and/or the frame 116. Suitable examples of rigid material that may be used for the shroud 110 and/or other components described herein include, but are not limited to, aluminum, stainless steel, aramid fibers, polycarbonate, polypropylene, other metallic materials, composite materials, or other similar materials.

The spreaders 130 may support the armrests 131 relative to the seat 100. The armrests 131 may provide structure for supporting arms of a passenger when supported by the seat 100. In various embodiments, the spreaders 130 and/or armrests 131 provide a physical lateral boundary for the seat 100, for example, providing a physical distinction between multiple seats 100 positioned laterally adjacent one another, such as in rows in an aircraft. Multiple seats 100 may also be arranged fore or aft of one another, e.g., such that a passenger supported by the front 106 of one seat back 102 may face the rear 108 of another seat back 102.

The rear 108 of the seat back 102 may include features accessible to a passenger facing the rear 108 of the seat back 102. For example, the shroud 110 (or seat back 102) may include a screen, telephone, or other form of interface 111 for communication, entertainment, or any other appropriate functions or features. Additionally or alternatively, the rear 108 of the seat back 102 may include a tray table assembly 112, such as to provide a table body 114 that can function as a flat surface for a passenger when desired, one example of which is shown by FIG. 2.

The illustrated table body 114 is formed of a single leaf, illustrated as generally rectangular in shape, although other geometries may be used as well. Additionally or alternatively, the table body 114 can include multiple leaves. For example, there may be folding two leaf tables.

The arms 128 can support the table body 114 relative to the seat 100. For example, in the embodiment illustrated by FIG. 1, each arm is 128 coupled with the seat 100 between the spreader 130 and the seat back 102. In various embodiments, the arms 128 can pivot and at least partially adjust a position of the table body 114.

The seat back 102 may have a tray table receiving portion 134. The tray table receiving portion 134 may have a receiving surface 136 and a securement mechanism 138, such as a latch. In various embodiments, the securement mechanism 138 may be formed at least partially in or behind the shroud 110.

Figure 3:
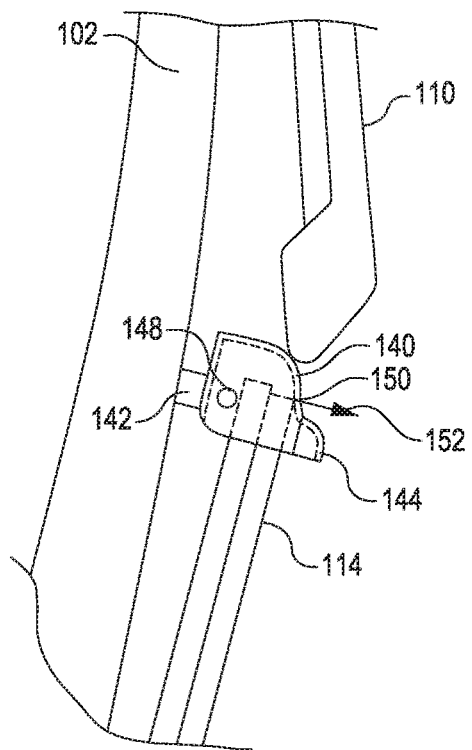
FIG. 3 is a side view of the latch assembly from the seat of FIG. 1, showing the tray table in the stowed configuration.
Figure 4:
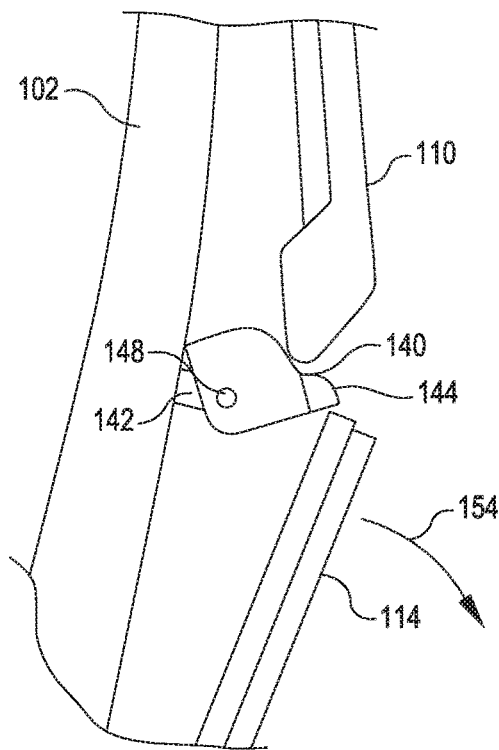
FIG. 4 is a side view of the latch assembly from the seat of FIG. 1, showing the tray table disengaged from the stowed configuration.
Figure 5:
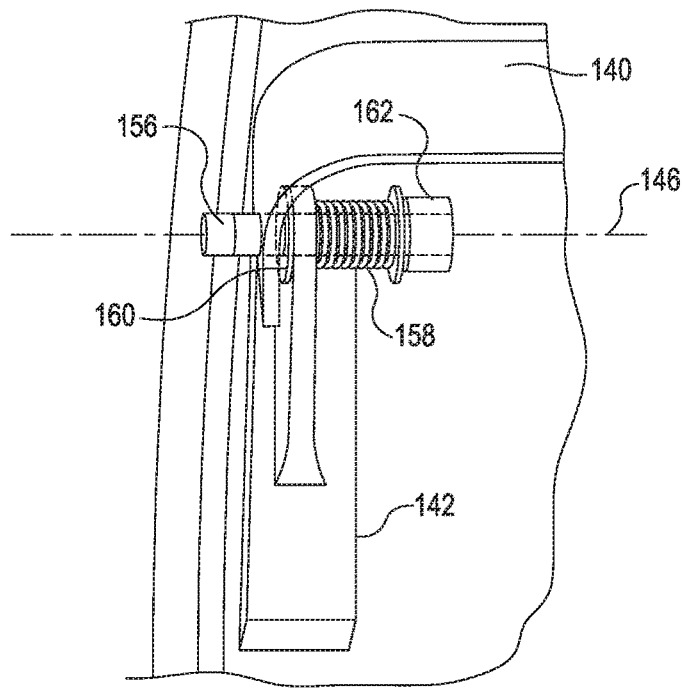
FIG. 5 is a detail view of an example of a mount of the latch assembly of the seat of FIG. 1.

The securement mechanism 138 is shown in additional detail in FIGS. 3-5. Turning to FIG. 3, the securement mechanism 138 is shown with a lid or cover 140 and a mount 142. The cover 140 is pivotally coupled to the mount 142 via a pivot 148. The mount 142 may correspond to a projection extending from the seat back 102 (e.g., from the rear 108).

In some embodiments, the mount 142 is secured to and/or supported by the frame 116 of the seat 100. Placement of the mount 142 near a lateral edge of the seat 100 may allow the mount 142 to be connected with the frame 116 with little intervening structure. For example, such an arrangement (in comparison to many known latches that are centrally positioned on the seat 100 and supported by a crossbar extending between lateral edges of the frame 116) may be connected to the frame 116 with less bracing structure and with an advantageous corresponding reduction in weight.

Although only one mount 142 is visible in the side view of FIG. 3, one or more other mounts 142 may be coupled with the cover 140, e.g., to support the cover 140 for pivoting. For example, the cover 140 may be supported by a pair of mounts 142 (e.g., a first projection and a second projection) coupled at opposite left and right sides of the frame 116.

The cover 140 may rotate about a pivot axis 146 (FIG. 5), which may be defined by alignment of the mount or mounts 142. For example, the cover 140 may rotate between a closed position shown in FIG. 3 and an open position shown in FIG. 4. In some aspects, at least some portion of the cover 140 can be positioned at least partially behind the shroud 110 when the cover 140 is in the open position and/or in the closed position. In various embodiments, the cover 140 includes a handle 144 (e.g., an area of the cover 140 shaped to receive fingers of an operator) that may be accessed to facilitate movement between the open and closed positions.

In the open position shown in FIG. 4, the cover 140 permits movement (e.g., as illustrated by arrow 154) of the table body 114 away from the stowed configuration of FIG. 1 and toward the deployed configuration of FIG. 2 or vice versa (e.g., opposite the direction of arrow 154). In the closed position shown in FIG. 3, the cover 140 can restrain or otherwise secure the table body 114.

The cover 140 may be shaped such that a portion of the table body 114 (e.g., at or near a top edge) rests against a contact surface 150 of the cover 140 when the cover 140 is in the closed position of FIG. 3. The contact surface 150 may correspond to a portion of the cover 140 at which a force (e.g., illustrated by arrow 152) is exerted on the cover 140 by the tray table body 114, such as due to a propensity of the tray table body 114 to move towards the deployed configuration under the influence of gravity or other forces. The shape of the cover 140 may cause the contact surface 150 to be substantially aligned with the pivot 148 and/or the mount 142 when the cover 140 is in the closed position of FIG. 3. Such alignment may minimize a moment or amount of torque exerted on the cover 140 by the table body 114 relative to the pivot 148. For example, this may reduce a risk of damage to the cover and/or a risk of the cover 140 accidentally opening in response to forces that urge the table body 114 toward the deployed configuration.

In the embodiment shown in FIGS. 1-5, the cover 140 is approximately as deep as it is tall (at portions apart from the handle 144) and larger in the length direction extending from left to right edges of the seat 100. In one illustrative example, the cover 140 may be approximately 25-80 mm deep, 25-80 mm tall, and 400-500 mm in length. However, other relative sizes of the cover 140 may additionally or alternatively be utilized.

In some aspects, the cover 140 may stay in place upon being opened or closed by an operator. For example, referring to FIG. 5, the cover 140 is shown secured to the mount 142 by a pin 156. A spring or other biasing member 158 is positioned so as to bias a portion of the pin 156 into engagement with the cover 140. Such engagement can provide sufficient friction between the cover 140 in the mount 142 to prevent movement of the cover 140 without being acted upon by an operator. In some aspects, a washer 160 or other component may be included that may provide an interface with particular friction characteristics between the cover 140 and the mount 142. In the illustrated embodiment of FIG. 5, the amount of friction acting on the cover 140 is adjustable in response to repositioning a nut 162 along a threaded surface to change a compression amount and corresponding force provided by the spring or biasing member 158. Other mechanisms may be utilized to provide adjustability.

In some embodiments, the cover 140 may automatically shut. For example, the spring or other biasing member 158 may correspond to a torsional spring that provides a biasing force to move the cover to a closed position (e.g., when not held open by an operator).

Figure 6:
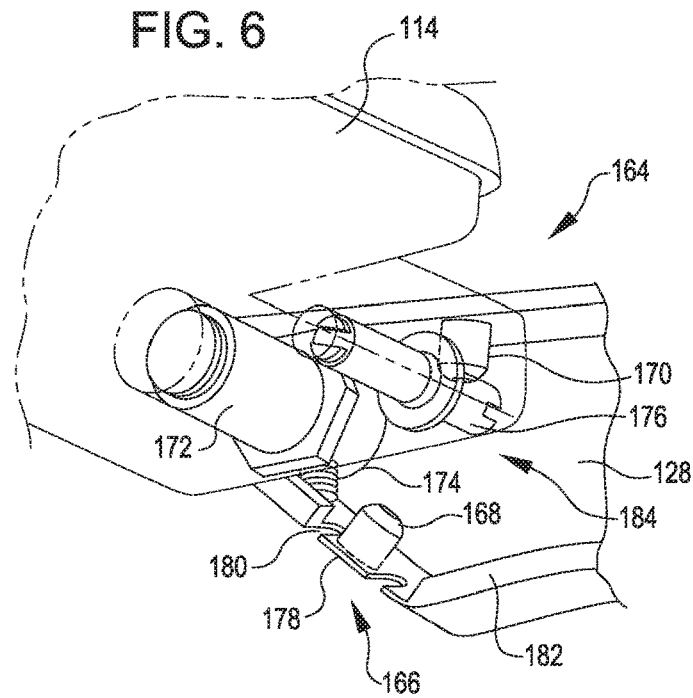
FIG. 6 is bottom perspective view of components of one example of an arm for the tray table assembly for the seat of FIG. 1.

Turning to FIG. 6, additional features of one the arms 128 are shown. Features of one arm 128 are shown for clarity, although similar features may be included in both arms 128. The arm 128 is shown in FIG. 6 with several features for coupling with the tray table body 114 to permit movement between the deployed configuration and the stowed configuration. A shaft 172 of the tray table body 114 is received in a pivot mount 174 of the arm 128. The pivot mount 174 may correspond to an opening or other suitable structure for receiving the shaft 172 so that the tray table body 114 can pivot about the shaft 172 relative to the arm 128. A rotation guide structure 176 (shown as a pin in FIG. 6) extends from the tray table body 114 and is positioned so as to travel within a space 184 of the arm 128. The rotation guide structure 176 is coupled with the tray table body 114 such that rotation of the tray table body 114 is limited by travel of the rotation guide structure 176. In an illustrative example, rotation of the tray table body 114 is obstructed when travel of the rotation guide structure 176 is obstructed, and in the absence of other obstructions, rotation of the tray table body 114 is allowed when travel of the rotation guide structure 176 is allowed.

The arm 128 shown in FIG. 6 also includes constraints 164. The constraints 164 permit movement of the tray table body 114 between stowed and deployed configurations, but limit motion of the table body 114 beyond these configurations during normal operation of the tray table assembly 112. In FIG. 6, the constraints 164 include a stowed configuration stopper 168 and a deployed configuration stopper 170. The rotation guide structure 176 can rotate through an arc or other path of travel between these stoppers in normal operation. For example, in normal operation, the rotation guide structure 176 may abut the stowed configuration stopper 168 when the table body 114 is in the stowed configuration and be prevented from moving past the stowed configuration by the stowed configuration stopper 168. Similarly, the rotation guide structure 176 may abut the deployed configuration stopper 170 when the table body 114 is in the deployed configuration and be prevented from moving past the deployed configuration by the deployed configuration stopper 170.

Each of the stowed configuration stopper 168 and the deployed configuration stopper 170 in FIG. 6 may have an adjustment structure. In FIG. 6, the adjustment structure is shown as a set screw. However, the adjustment structure may correspond to other structures including sliding pins, ratcheting elements, or any other structure that can be adjusted to change an endpoint of a path of travel of the rotation guide structure 176. Thus, as an illustrative example, a set screw of the stowed configuration stopper 168 may be tightened or loosened to change a resting position of the rotation guide structure 176 and correspondingly change an orientation of the tray table body 114 in the stowed configuration. Similarly, a set screw of the deployed configuration stopper 170 may be adjusted to correspondingly adjust orientation of the tray table body 114 in the deployed configuration. The respective set screws are shown received in a set of flanges 182 (which may include one or more flanges 182) that extend from the arm 128 so as to at least in part define the space 184 in which the rotation guide structure 176 can move. However, in some embodiments, adjustment structures may be omitted. For example, either or both of the stowed configuration stopper 168 or the deployed configuration stopper 170 may correspond to flanges 182 or other structure without set screws and/or without other adjustment features.

The arm 128 shown in FIG. 6 also includes a constraint release feature 166. The constraint release feature 166 may correspond to a deformable or otherwise modifiable feature of the arm 128 that facilitates a change in state of the constraint 164. In this illustrated embodiment, the constraint release feature 166 includes a portion 178 of the flange 182 that is thinner than other portions of the flange 182, which may permit the portion 178 to deform or rupture in particular scenarios. The constraint release feature 166 can function to override a constraint 164 in certain situations, for example, to permit travel past the deployed position and/or the stowed position. In FIG. 6, the constraint release feature 166 is arranged to permit override of the stowed configuration stopper 168. The constraint release feature 166 may correspond to an intended point of failure that can change a position or state of the stowed configuration stopper 168 so as to permit additional movement of the rotation guide structure 176. For example, in addition to or in lieu of the thinner portion 178 of the flange 182, the release feature 166 may correspond to a portion 178 that is separated from other portions of the flange 182 by notches 180. Such configuration may allow the portion of the flange 182 that corresponds to the constraint release feature 166 to rupture or deform in certain scenarios and allow additional movement of the rotation guide structure. However, other arrangements for the constraint release feature 166 are also possible, including but not limited to arrangements that do not include notches 180, that do not include a thinner portion of the flange 182, and/or that incorporate other features described herein.

Figure 7:
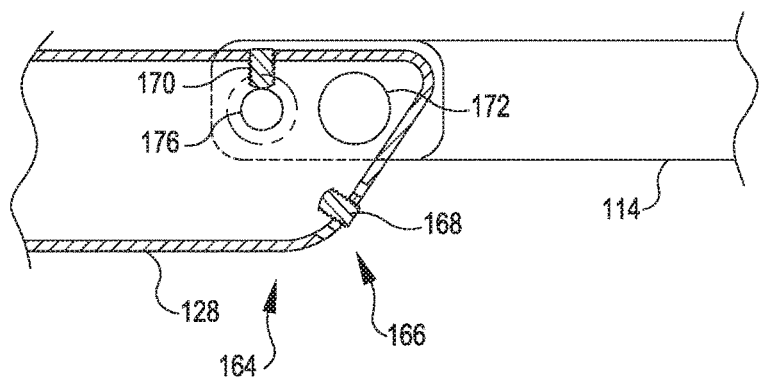
FIG. 7 is side view of the components of FIG. 6 in a deployed configuration.
Figure 8:
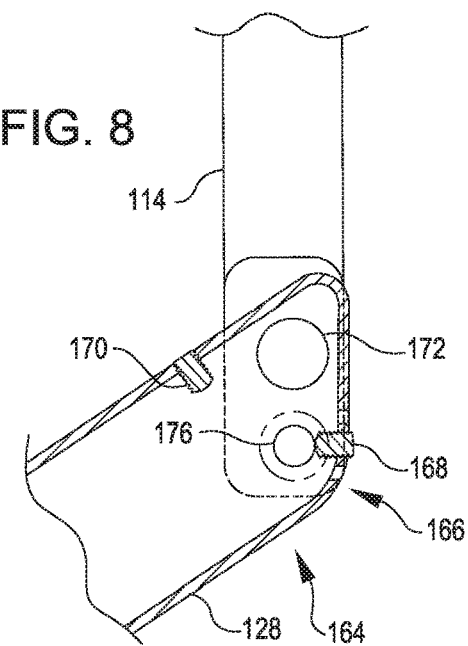
FIG. 8 is side view of the components of FIG. 6 in a stowed configuration.
Figure 9:
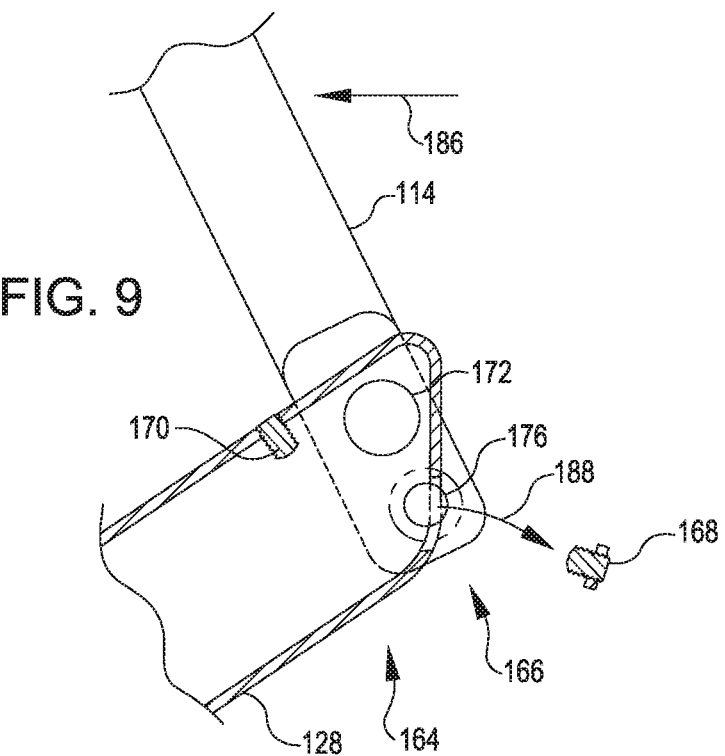
FIG. 9 is side view of the components of FIG. 6 in another configuration.

FIGS. 7-9 illustrate operation of the arrangement of FIG. 6. As shown in FIG. 7, in the deployed configuration, the rotation guide structure 176 abuts the deployed configuration stopper 170. Under normal loads expected on the tray table body 114, the deployed configuration stopper 170 is sufficiently strong to prevent the rotation guide structure 176 from rotating past the deployed configuration. As an illustrative example, the size and material of the components utilized may be selected so as to be sufficient to withstand at least 150 pounds of force applied to the table body 114 in the deployed configuration.

As shown in FIG. 8, in the stowed configuration, the rotation guide structure 176 abuts the stowed configuration stopper 168. Under normal loads expected on the tray table body 114, the stowed configuration stopper 168 is sufficiently strong to prevent the rotation guide structure 176 from rotating past the stowed configuration.

As shown in FIG. 9, in response to a sufficient threshold force applied to the tray table body 114 (e.g., as illustrated by arrow 186, such as due to significant impact occurring higher up on the seat 100 during a crash scenario), the rotation guide structure 176 may exert sufficient force to activate the constraint release feature 166. For example, the rotation guide structure 176 may press with sufficient force to displace the stowed configuration stopper 168 (e.g., as illustrated by arrow 188). Such displacements may provide room for the rotation guide structure 176 to move past the stowed configuration shown in FIG. 8. For example, as illustrated in FIG. 9, the rotation guide structure 176 may move at least partially out of the arm 128 in the absence of the displaced stowed configuration stopper 168. Such functionality may permit an upper portion of the tray table body 114 to pivot along with the seat back 102 more freely than if the rotation guide structure 176 were instead still blocked by the constraint 164 (e.g., the stowed configuration stopper 168).

Figure 10:
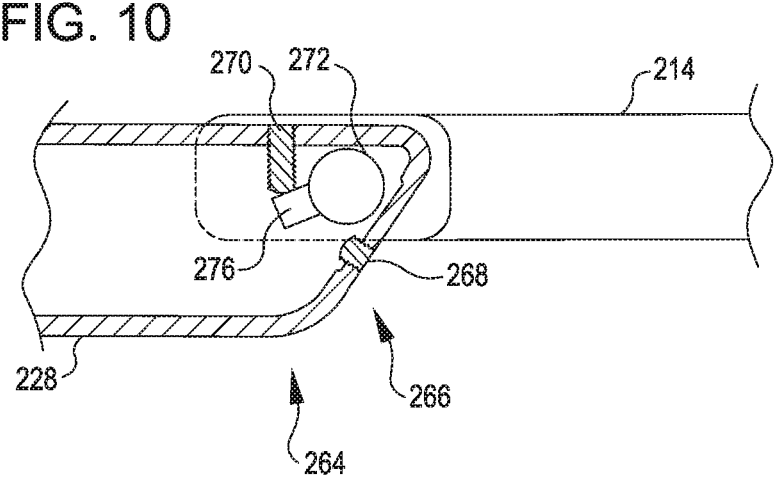
FIG. 10 is side view of components of another example of an arm for the tray table assembly for the seat of FIG. 1, showing the components in a deployed configuration.

Another embodiment of a tray table arm 228 is shown in FIGS. 10-12. The tray table arm 228 includes features that may be used in lieu of or in addition to features described above with respect to arm 128. The arm 228 is shown in association with a tray table body 214, a pivot shaft 272, a rotation guide structure 276, constraints 264 (e.g., including a stowed configuration stopper 268 and a deployed configuration stopper 270), and a constraint release feature 266. These features may be similar to the features of like names described with respect to the arm 128, and, as such, description of various aspects of these features is not repeated.

In the embodiments illustrated in FIGS. 10-12, the rotation guide structure 276 is shown mounted on the pivot shaft 272. Such an arrangement may cause the rotation guide structure 276 to rotate in response to rotation of the pivot shaft 272, based on movement of tray table body 214 relative to stowed and deployed configurations. For example, movement of the tray table body 214 from the deployed configuration illustrated in FIG. 10 to the stowed configuration illustrated in FIG. 11 may rotate the pivot shaft 272 and cause the rotation guide structure 276 to move from a position abutting the deployed configuration stopper 270 (FIG. 10) and to a position abutting the stowed configuration stopper 268 (FIG. 11). In response to application of a sufficient threshold force to the tray table body 214 (e.g., as illustrated by arrow 286 in FIG. 12 and as may occur in certain crash scenarios), the rotation guide structure 276 may press against the stowed configuration stopper 268 with sufficient intensity to trigger the constraint release feature 266 and displace the stowed configuration stopper 268 (e.g., such as illustrated by arrow 288). In effect, this may override the constraint 264 and permit or facilitate movement of the tray table body 214 past the stowed configuration illustrated in FIG. 11.

Figure 13:
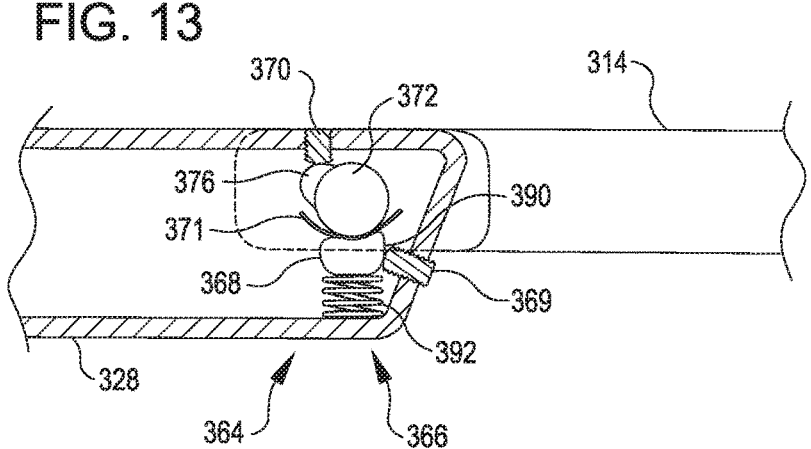
FIG. 13 is side view of components of a further example of an arm for the tray table assembly for the seat of FIG. 1, showing the components in a deployed configuration.
Figure 14:
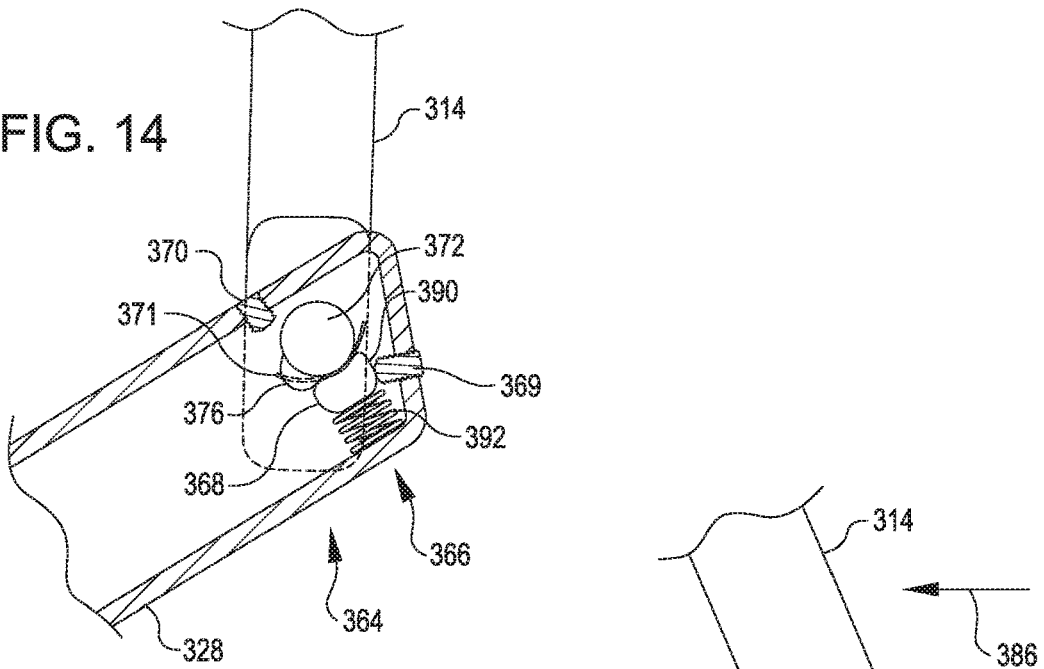
FIG. 14 is side view of the components of FIG. 13 in a stowed configuration.
Figure 15:
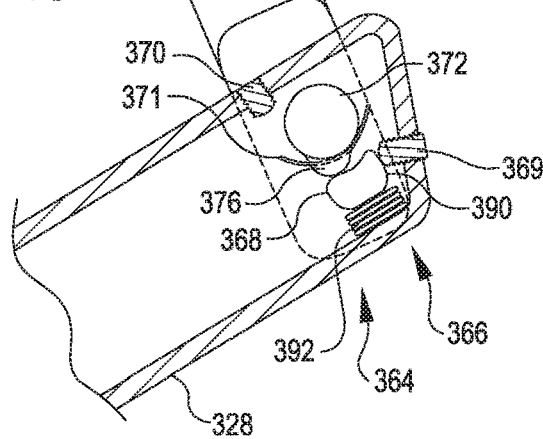
FIG. 15 is side view of the components of FIG. 13 in another configuration.

A further embodiment of a tray table arm 328 is shown in FIGS. 13-15. The tray table arm 328 includes features that may be used in lieu of or in addition to features described above with respect to arm 128 and/or arm 228. The arm 328 is shown in association with a tray table body 314, a pivot shaft 372, a rotation guide structure 376, constraints 364 (e.g., including a stowed configuration stopper 368 and a deployed configuration stopper 370), and a constraint release feature 366. These features may be similar to the features of like names described with respect to the arm 128 and/or arm 228, and, as such, description of various aspects of these features is not repeated.

In the embodiments illustrated in FIGS. 13-15, the rotation guide structure 376 is mounted on the pivot shaft 372. Although the rotation guide structure 376 is shown as a rectangular bar, any other suitable structure may be utilized, including a protrusion, an arm, a flange, or a bulge. Movement of the table body 314 from the deployed configuration illustrated in FIG. 13 to the stowed configuration illustrated in FIG. 14 may rotate the pivot shaft 372 and cause the rotation guide structure 376 to move from a position abutting the deployed configuration stopper 370 (FIG. 13) and to a position abutting the stowed configuration stopper 368 (FIG. 14).

The deployed configuration stopper 370 shown in FIGS. 13-15 includes a blocking structure 390 and a deformable member 392. The blocking structure 390 is shaped so as to receive the rotation guide structure 376. For example, the blocking structure 390 may include an indentation shaped to receive an extension of the rotation guide structure 376 in response to rotation of the rotation guide structure 376. The rotation guide structure 376 may function as a cam surface, and the blocking structure 390 may function as a corresponding cam-following surface.

The deformable member 392 in FIGS. 13-14 is shown in an arrangement that biases the blocking structure 390 into a position that blocks rotation of the rotation guide structure 376. In this way, the deformable member 392 may prevent rotation of the tray table body 314 (e.g., past the stowed configuration) until sufficient force is applied to the deformable member 392 to cause compression thereof and permit movement of the blocking structure 390. For example, in response to a threshold force 386 applied to the table body 314 the rotation guide structure 376 may apply sufficient force through the blocking structure 390 to the deformable member 392 to cause the deformable member 392 to deform. This deformation may allow the blocking structure 390 to move (e.g., following the cam surface motion of the rotation guide structure 376). Movement of the blocking structure 390 may provide space for the rotation guide structure 376 to continue rotating so as to permit movement of the tray table body 314 past the stowed configuration.

The deformable member 392 may correspond to various suitable structures for achieving the functionality described above. In some embodiments, the deformable member 392 may include a crushable member having a material strength and/or structural geometry that can withstand up to a predetermined amount of force and will yield when subjected to a magnitude of force exceeding that predetermined amount. Such an arrangement may result in a permanent deformation of the deformable member 392, for example, which may facilitate detection that the tray table body 314 has been subjected to forces sufficient to warrant maintenance or replacement of the tray table body 314 and/or associated components. In some embodiments, the deformable member 392 may include a spring or other elastic member. For example, a spring may be selected with a suitable stiffness for biasing the blocking structure 390 into a blocking position in the absence of forces over a predetermined magnitude. In some scenarios, use of a spring or other elastic member may permit deformation of the deformable member 392 to be temporary. For example, a spring may compress in response to crash-magnitude forces acting on the tray table body 314 to permit movement of the tray table body 314 with the seat back 102 and then decompress when the crash-magnitude forces have subsided to once again constrain the tray table body 314 to movement between deployed and stowed configurations.

In various embodiments, any of the constraints 364 (e.g., including the stowed configuration stopper 368 and/or the deployed configuration stopper 370) may be adjustable through an adjustment structure for altering an endpoint of a path of travel of the rotation guide structure 376. Such adjustment may be useful for causing a corresponding change in orientation of the tray table body 314 in the stowed configuration and/or the deployed configuration, (e.g., similar to the functionality described above with respect to FIG. 6). For example, in the embodiment illustrated in FIGS. 13-15, a resting position of the blocking structure 390 may be adjustable by turning a set screw 369 or otherwise adjusting an adjustment structure. Changing the resting position of the blocking structure 390 can change a location at which the rotation guide structure 376 will encounter or interfere with the blocking structure 390, thus in turn adjusting an orientation of the tray table body 314 in the stowed configuration.

In FIGS. 13-15, the arm 328 is shown with a ridge 371 that can guide positioning of the blocking structure 390 as the blocking structure is moved by the set screw 369. The ridge 371 may be curved or otherwise shaped so that the blocking structure 390 will slide or otherwise move along the ridge 371. Such an arrangement can maintain the blocking structure in alignment with other elements such as the pivot shaft 372 and/or the rotation guide structure 376. The ridge 371 is shown positioned behind the path of travel of the rotation guide structure 376 (e.g., further into the page in FIGS. 13-15). Such positioning may permit a first portion of the blocking structure 390 (e.g., corresponding to a portion further into the page in FIGS. 13-15) to rest against the ridge 371, while a second portion of the blocking structure 390 (e.g., corresponding to a portion further out of the page in FIGS. 13-15) is positioned in alignment for engaging the rotation guide structure 376. This arrangement can allow the ridge 371 and the rotation guide structure 376 to perform their respective functions without interfering with one another.

Components described with respect to FIGS. 6-15 are not limited to use with the seat 100 and the corresponding securement mechanism 138 shown in FIGS. 1-5. Rather, such components may additionally or alternatively be used in conjunction with other types of seats or latches. One such option is shown in FIG. 16-17.

Figure 16:
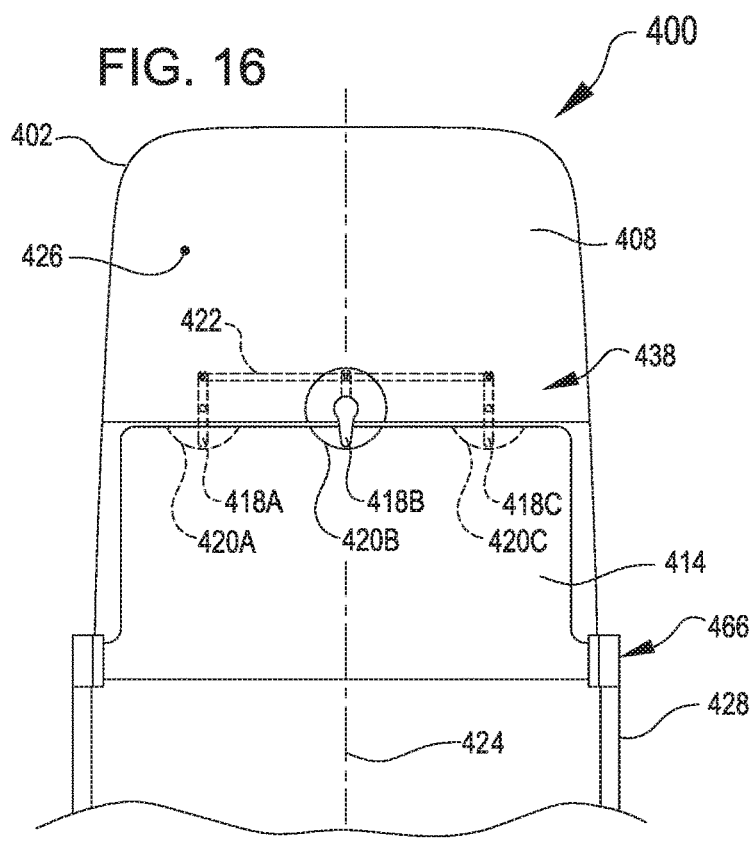
FIG. 16 is a rear view of a seat with a tray table movable between stowed and deployed configurations, according to certain embodiments of the present disclosure.
Figure 17:
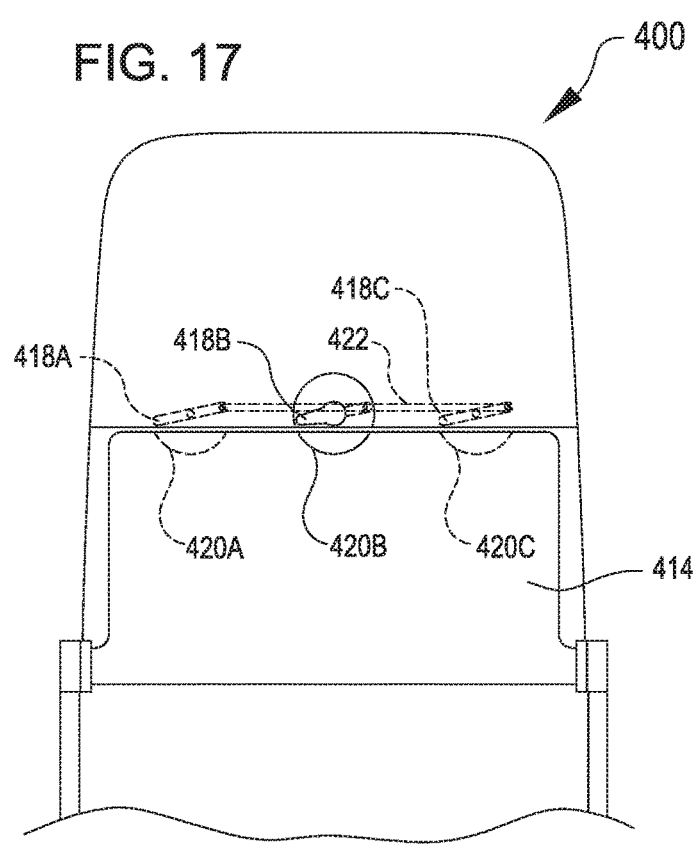
FIG. 17 is a rear view of the seat of FIG. 16, showing the tray table disengaged from the stowed configuration.

FIGS. 16-17 illustrate a seat 400 that may be used according to various embodiments herein. The depicted seat 400 includes a seat back 402 (with a rear 408 visible), arms 428, a tray table body 414, a securement mechanism 438, and constraint release features 466. These and other features may be similar to the features of like names described with respect to the seat 100, and, as such, description of various aspects of these features is not repeated.

The securement mechanism 438 of the seat 400 differs from the securement mechanism 138 of FIG. 1. The securement mechanism 438 of the seat 400 is shown with three levers 418 (individually identified in FIGS. 16-17 as 418A, 418B, and 418C). Each of these three levers 418 in FIG. 16 is received in a corresponding recess 420 (individually identified in FIGS. 16-17 as 420A, 420B, and 420C). The recesses 420 are formed in the tray table body 414, with the middle recess 420B formed on an exterior of the tray table body 414 and the left recess 420A and the right recess 420C being formed on an interior of the tray table body 414 (e.g., along a top edge of the tray table body 414). The middle lever 418B is positioned so as to be accessible from the exterior of the seat back 402, while the left lever 418A and the right lever 418C are positioned within an interior of the seat back 402.

The middle lever 418B is connected with the left lever 418A and the right lever 418C via a linkage 422 such that actuation of the middle lever 418B will cause a corresponding actuation of the left lever 418A and the right lever 418C. For example, the middle lever 418B may be actuated by an operator to cause all of the levers 418 to move out of respective recesses 420, such as to transition from the position shown in FIG. 16 to the position shown in FIG. 17 in order to permit the tray table body 414 to be moved between deployed and stowed configurations.

Other variations of the seat 400 are also possible. In some embodiments, a different combination of levers 418 may be hidden or exposed. In an illustrative example, all three of the depicted levers 418 may instead be exposed. This may allow an operator to actuate any one of the levers 418 to cause actuation of one or more of the levers 418, e.g., through the linkage 422. In some embodiments, other numbers of levers 418 may be utilized. For example, the seat 400 may include one lever 418 (e.g., the central lever 418B could be provided without the linkage 422, without the left lever 418A, and without the right lever 418C), two levers 418 (e.g., the left lever 418A and the right lever 418C could be provided without the central lever 418B), three levers (e.g., as illustrated or in another arrangement), or more than three levers.

The constraint release features 466 may correspond to any of the constraint release features described herein. The constraint release features 466 may be of particular use for a tray table body 414 that can be secured on both left and right sides of a vertical central axis 424 of the seat back 402 (such as is the case for the depicted embodiments of seats 400, 100, and/or other seats). The constraint release features 466 additionally or alternatively may be of particular use for crash scenarios in which a passenger may collide with the seat back 402 at an oblique angle. In an illustrative example, a passenger may be propelled forward into the seat back 402 during a crash scenario, e.g., such that the passenger's head contacts the rear 408 of the seat back 402 at a position 426 above the tray table body 414 to the left of the vertical centerline 424. Such contact can cause the seat back 402 to twist about the vertical central axis 424. Because the securement mechanism 438 is securing the tray table body 414 to the seat back 402, this twisting may exert forces on the tray table body 414. These forces exerted on the tray table body 414 may be of sufficient magnitude to trigger the constraint release feature 466. Triggering the constraint release feature 466 may release a constraint on the table body 414 (e.g., at a lower right side of the table body 414) and permit motion of the tray table body 414 (e.g., at an upper left side of the table body 414) with the twisting of the seat back 402. In the absence of the triggering of the constraint release feature 466, such motion might otherwise be inhibited by the constraint. Inhibiting such motion could cause pulling with sufficient force to damage the left lever 418A and/or to cause a top left edge of the tray table body 414 to separate from the seat back 402 sufficiently to pose a projecting hazard to the passenger's head.

In some aspects, an apparatus is provided according to one or more of the following examples or according to some combination of the elements thereof. In some aspects, an apparatus described in one or more of these examples can be utilized to perform a method.

Example #1

A tray table arm comprising: (a) a pivot mount configured to receive a shaft of a tray table body so as to permit rotation of the tray table body relative to the tray table arm; (b) a stowed configuration stopper; (c) a deployed configuration stopper, the stowed configuration stopper and the deployed configuration stopper defining ends of a path of travel, the stowed configuration stopper and the deployed configuration stopper disposed such that the path of travel is sized to permit travel therein of a rotation guide structure coupled with the tray table body such that (i) rotation of the tray table body is obstructed when travel of the rotation guide structure is obstructed and (ii) rotation of the tray table body is allowed when travel of the rotation guide structure is allowed, the stowed configuration stopper configured to block travel of the rotation guide structure past one end along the path of travel so as to prevent rotation of the tray table body past a stowed configuration of the tray table body, and the deployed configuration stopper configured to block travel of the rotation guide structure past another end along the path of travel so as to prevent rotation of the tray table body past a deployed configuration of the tray table body; and (d) an override feature configured to, in response to exertion of a force exceeding a threshold upon the tray table body, modify at least one of a position, structure, or configuration of the deployed configuration stopper so as to permit travel of the rotation guide structure past the one end along the path of travel so as to permit rotation of the tray table body past the stowed configuration of the tray table body.

Example #2

The tray table arm of Example #1, or any of the preceding or subsequent examples, wherein the override feature comprises a portion of the tray table arm comprising the stowed configuration stopper, said portion configured to rupture so as to permit passage of the rotation guide structure therethrough in response to exertion of the force exceeding the threshold upon the tray table body.

Example #3

The tray table arm of Example #1, or any of the preceding or subsequent examples, wherein the override feature comprises a biasing member configured to resist displacement of the stowed configuration stopper from a position at the one end of the path of travel in an absence of exertion of the force exceeding the threshold upon the tray table body.

Example #4

The tray table arm of any of Example #1, or any of the preceding or subsequent examples, wherein the tray table arm is configured to receive the rotation guide structure in a configuration in which the rotation guide structure is mounted on the shaft of the tray table body.

Example #5

The tray table arm of Example #1, or any of the preceding or subsequent examples, wherein the tray table arm is configured to receive the rotation guide structure in a configuration in which the rotation guide structure is coupled with the tray table body separately from the shaft of the tray table body.

Example #6

The tray table arm of Example #1, or any of the preceding or subsequent examples, further comprising at least one adjustment structure configured for adjustably positioning at least one of the stowed configuration stopper or the deployed configuration stopper so as to change a position of at least one end of the travel path.

Example #7

A tray table assembly comprising: (a) a table body movable between a stowed configuration and a deployed configuration; and (b) a set of arms configured to support the table body relative to a seat back in the stowed configuration and in the deployed configuration, wherein the set of arms is configured, in response to movement of the seat back, to release a constraint of the table body that would otherwise inhibit the table body from moving with the seat back.

Example #8

The tray table assembly of Example #7, or any of the preceding or subsequent examples, wherein an upper portion of the table body in the stowed configuration is secured at a first location on a left side of a centerline of the table body and at a second location on a right side of the centerline of the table body.

Example #9

The tray table assembly of Example #7 or 8, or any of the preceding or subsequent examples, wherein the constraint of the table body would otherwise inhibit the table body from moving with the seat back in a twisting motion about an axis oriented from top to bottom of the seat back.

Example #10

The tray table assembly of any of Example #s 7-9, or any of the preceding or subsequent examples, wherein the table body is pivotable at a lower portion thereof relative to the set of arms.

Example #11

A passenger seat comprising: (a) a seat back having a front and a rear; (b) a set of arms; (c) a table body supported relative to the seat back by the set of arms; the table body coupled with the set of arms so as to be movable between a stowed configuration and a deployed configuration; (d) a constraint configured to permit movement of the table body between the stowed and deployed configurations and to prevent the table body from travelling beyond the stowed or deployed configurations; and (e) a constraint release feature incorporated into the set of arms and deformable to release or modify the constraint when the table body is in the stowed configuration and subjected to a force that makes a portion of the table body move with the seat back, whereby release or modification of the constraint by the constraint release feature facilitates movement of the table body with the seat back.

Example #12

The passenger seat of Example #11, or any of the preceding or subsequent examples, further comprising a latch assembly configured to secure both a left side and a right side of an upper portion of the table body when in the stowed configuration.

Example #13

The passenger seat of Example #12, or any of the preceding or subsequent examples, wherein the latch assembly comprises: (a) a first projection and a second projection extending from the rear of the seat back and aligned with one another so as to define an axis therebetween; and (b) a cover pivotally mounted on the first projection and the second projection so as to rotate about the axis between a closed configuration in which the cover secures a top portion of the table body in the stowed configuration and an open configuration in which the cover is situated so as to permit movement of the table body to or from the stowed configuration.

Example #14

The passenger seat of Example #13, or any of the preceding or subsequent examples, wherein the cover comprises a contact surface corresponding to a location in which an upper portion of the table body contacts the cover when the cover is in the closed configuration and the table body is in the stowed configuration, wherein a shape of the cover causes the contact surface to be substantially aligned with the axis when the cover is in the closed configuration.

Example #15

The passenger seat of Example #13 or 14, or any of the preceding or subsequent examples, further comprising a shroud, wherein at least a portion of the cover is rotated behind the shroud when moving between the closed configuration and the open configuration.

Example #16

The passenger seat of Example #12, or any of the preceding or subsequent examples, wherein the latch assembly comprises: (a) a first lever positioned to secure the right side of an upper portion of the table body; and (b) a second lever positioned to secure the left side of an upper portion of the table body.

Example #17

The passenger seat of Example #16, or any of the preceding or subsequent examples, wherein the first lever and the second lever are operatively coupled such that at least one of: (a) actuating the first lever will cause actuation of the second lever; or (b) actuating of the second lever will cause actuation of the first lever.

Example #18

The passenger seat of Example #16 or 17, or any of the preceding or subsequent examples, further comprising a central lever positioned to secure a central area of an upper portion of the table body, the central lever operatively coupled with the first lever and the second lever such that actuating the central lever will cause actuation of the first lever and the second lever.

Example #19

The passenger seat of any of Example # s 16-18, or any of the preceding or subsequent examples, wherein at least one of the levers is positioned at least partially within an interior between the front and the rear of the seat back and at least partially within an interior of the table body when the table body is secured by the latch assembly in the stowed configuration.

Example #20

The passenger seat of Example #11, or any of the preceding or subsequent examples, further comprising a central lever positioned to secure a central area of an upper portion of the table body.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table assembly comprising:
    a table body movable between a stowed configuration and a deployed configuration;
    a set of arms configured to support the table body relative to a seat back in the stowed configuration and in the deployed configuration; and
    a latch assembly configured to secure an upper portion of the table body in the stowed configuration at a first location on a left side of a centerline of the table body and at a second location on a right side of the centerline of the table body, wherein the latch assembly comprises:
        a first projection and a second projection extending from a rear of the seat back and aligned with one another so as to define an axis therebetween; and
        a cover pivotally mounted on the first projection and the second projection so as to rotate about the axis between a closed configuration in which the cover secures a top portion of the table body in the stowed configuration and an open configuration in which the cover is situated so as to permit movement of the table body to or from the stowed configuration.

2. The tray table assembly of claim 1, wherein the set of arms is configured, in response to movement of the seat back, to release a constraint of the table body that would otherwise inhibit the table body from moving with the seat back; and
    wherein the constraint of the table body would otherwise inhibit the table body from moving with the seat back in a twisting motion about an axis oriented from top to bottom of the seat back.

3. The tray table assembly of claim 1, wherein the set of arms is configured, in response to movement of the seat back, to release a constraint of the table body that would otherwise inhibit the table body from moving with the seat back; and
    wherein the table body is pivotable at a lower portion thereof relative to the set of arms.

4. The tray table assembly of claim 1, wherein the set of arms includes a tray table arm comprising:
    a pivot mount configured to receive a shaft of the table body so as to permit rotation of the table body relative to the tray table arm;
    a stowed configuration stopper;
    a deployed configuration stopper, the stowed configuration stopper and the deployed configuration stopper defining ends of a path of travel, the stowed configuration stopper and the deployed configuration stopper disposed such that the path of travel is sized to permit travel therein of a rotation guide structure coupled with the table body such that (i) rotation of the table body is obstructed when travel of the rotation guide structure is obstructed and (ii) rotation of the table body is allowed when travel of the rotation guide structure is allowed, the stowed configuration stopper configured to block travel of the rotation guide structure past one end along the path of travel so as to prevent rotation of the table body past the stowed configuration of the table body, and the deployed configuration stopper configured to block travel of the rotation guide structure past another end along the path of travel so as to prevent rotation of the table body past the deployed configuration of the table body; and
    an override feature configured to, in response to exertion of a force exceeding a threshold upon the table body, modify at least one of a position, structure, or configuration of the deployed configuration stopper so as to permit travel of the rotation guide structure past the one end along the path of travel so as to permit rotation of the table body past the stowed configuration of the table body.

5. The tray table assembly of claim 4, wherein the override feature comprises a portion of the tray table arm comprising the stowed configuration stopper, said portion configured to rupture so as to permit passage of the rotation guide structure therethrough in response to exertion of the force exceeding the threshold upon the table body.

6. The tray table assembly of claim 4, wherein the override feature comprises a biasing member configured to resist displacement of the stowed configuration stopper from a position at the one end of the path of travel in an absence of exertion of the force exceeding the threshold upon the table body.

7. The tray table assembly of claim 4, wherein the tray table arm is configured to receive the rotation guide structure in a configuration in which the rotation guide structure is mounted on the shaft of the table body.

8. The tray table assembly of claim 4, wherein the tray table arm is configured to receive the rotation guide structure in a configuration in which the rotation guide structure is coupled with the table body separately from the shaft of the table body.

9. The tray table assembly of claim 4, further comprising at least one adjustment structure configured for adjustably positioning at least one of the stowed configuration stopper or the deployed configuration stopper so as to change a position of at least one end of the path of travel.

10. A passenger seat comprising:
a seat back having a front and a rear;
a set of arms;
a table body supported relative to the seat back by the set of arms; the table body coupled with the set of arms so as to be movable between a stowed configuration and a deployed configuration; and
a latch assembly configured to secure both a left side and a right side of an upper portion of the table body when in the stowed configuration, wherein the latch assembly comprises:
a first projection and a second projection extending from the rear of the seat back and aligned with one another so as to define an axis therebetween; and
a cover pivotally mounted on the first projection and the second projection so as to rotate about the axis between a closed configuration in which the cover secures a top portion of the table body in the stowed configuration and an open configuration in which the cover is situated so as to permit movement of the table body to or from the stowed configuration.

11. The passenger seat of claim 10, wherein the cover comprises a contact surface corresponding to a location in which the upper portion of the table body contacts the cover when the cover is in the closed configuration and the table body is in the stowed configuration, wherein a shape of the cover causes the contact surface to be substantially aligned with the axis when the cover is in the closed configuration.

12. The passenger seat of claim 10, further comprising a shroud, wherein at least a portion of the cover is rotated behind the shroud when moving between the closed configuration and the open configuration.

13. A tray table assembly comprising:
a table body movable between a stowed configuration and a deployed configuration;
a set of arms configured to support the table body relative to a seat back in the stowed configuration and in the deployed configuration; and
a latch assembly configured to secure both a left side and a right side of an upper portion of the table body when in the stowed configuration, wherein the latch assembly comprises:
a first lever positioned to secure the right side of the upper portion of the table body; and
a second lever positioned to secure the left side of the upper portion of the table body.

14. The tray table assembly of claim 13, wherein the first lever and the second lever are operatively coupled such that at least one of:
actuating the first lever will cause actuation of the second lever; or
actuating of the second lever will cause actuation of the first lever.

15. The tray table assembly of claim 13, further comprising a central lever positioned to secure a central area of the upper portion of the table body, the central lever operatively coupled with the first lever and the second lever such that actuating the central lever will cause actuation of the first lever and the second lever.

16. The tray table assembly of claim 13, wherein at least one of the levers is positioned at least partially within an interior between a front and the rear of a seat back and at least partially within the interior of the table body when the table body is secured by the latch assembly in the stowed configuration.

17. The tray table assembly of claim 13, further comprising a central lever positioned to secure a central area of the upper portion of the table body.

18. The tray table assembly of claim 13, further comprising:
a constraint configured to permit movement of the table body between the stowed and deployed configurations and to prevent the table body from travelling beyond the stowed or deployed configurations; and
a constraint release feature incorporated into the set of arms and deformable to release or modify the constraint when the table body is in the stowed configuration and subjected to a force that makes a portion of the table body move with the seat back, whereby release or modification of the constraint by the constraint release feature facilitates movement of the table body with the seat back.

* * * * *